United States Patent
Fischer

(10) Patent No.: US 12,170,711 B2
(45) Date of Patent: Dec. 17, 2024

(54) METHOD AND SYSTEM FOR TRANSMITTING SOFTWARE ARTIFACTS FROM A SOURCE NETWORK TO A TARGET NETWORK

(71) Applicant: Siemens Aktiengesellschaft, Munich (DE)

(72) Inventor: Jan-Gregor Fischer, Zorneding (DE)

(73) Assignee: Siemens Aktiengesellschaft, Munich (DE)

( * ) Notice: Subject to any disclaimer, the term of this patent is extended or adjusted under 35 U.S.C. 154(b) by 2 days.

(21) Appl. No.: 17/919,097

(22) PCT Filed: Apr. 9, 2021

(86) PCT No.: PCT/EP2021/059246
§ 371 (c)(1),
(2) Date: Oct. 14, 2022

(87) PCT Pub. No.: WO2021/209323
PCT Pub. Date: Oct. 21, 2021

(65) Prior Publication Data
US 2023/0179667 A1    Jun. 8, 2023

(30) Foreign Application Priority Data
Apr. 17, 2020 (EP) .................................... 20170134

(51) Int. Cl.
*G06F 15/16* (2006.01)
*H04L 67/00* (2022.01)
(52) U.S. Cl.
CPC ................................. *H04L 67/34* (2013.01)
(58) Field of Classification Search
None
See application file for complete search history.

(56) References Cited

U.S. PATENT DOCUMENTS

| 8,156,488 B2 | 4/2012 | Kotamarthi et al. |
| 10,348,767 B1 * | 7/2019 | Lee ..................... H04L 63/0236 |

(Continued)

FOREIGN PATENT DOCUMENTS

| EP | 2 339 459 A1 | 6/2011 |
| WO | WO 2016061520 A1 | 4/2016 |

OTHER PUBLICATIONS

PCT International Search Report and Written Opinion of International Searching Authority mailed Jun. 24, 2021 corresponding to PCT International Application No. PCT/EP2021/059246 filled Apr. 9, 2021.

*Primary Examiner* — Phuoc H Nguyen
(74) *Attorney, Agent, or Firm* — Henry M. Feiereisen LLC

(57) ABSTRACT

A method for transmitting software artifacts from a source network to a target network is disclosed. Each target and source network is assigned to a proxy system comprising a plug-in. The transmission is monitored on the target network side. A target network-internal information structure is provided containing entries, each of which characterizes a software artifact that can be downloaded when authorization is granted by an operator of the target network by the plug-in. The entries are read from the target network-internal information structure. Requests from the target network relating to the availability of new software artifacts are received on behalf of the source network. For each request, at least one entry which matches the request is searched in the target network-internal information structure. Based on the at least one matching entry being present in the target network-internal information structure, either the software artifact is retrieved or the request is blocked.

28 Claims, 2 Drawing Sheets

(56) References Cited

U.S. PATENT DOCUMENTS

| | | | |
|---|---|---|---|
| 2007/0094400 A1 | 4/2007 | Childress et al. | |
| 2007/0156694 A1* | 7/2007 | Lim | G06F 16/176 |
| | | | 707/999.009 |
| 2008/0060051 A1* | 3/2008 | Lim | G06F 16/93 |
| | | | 726/1 |
| 2010/0281102 A1* | 11/2010 | Chinta | G06F 21/53 |
| | | | 709/217 |
| 2011/0154135 A1 | 6/2011 | Tyhurst et al. | |
| 2013/0238165 A1* | 9/2013 | Garrett | H04M 1/72406 |
| | | | 701/2 |
| 2013/0244634 A1* | 9/2013 | Garrett | G06F 9/445 |
| | | | 455/418 |
| 2013/0347094 A1 | 12/2013 | Bettini et al. | |
| 2014/0215082 A1* | 7/2014 | Backholm | H04L 65/1069 |
| | | | 709/227 |
| 2015/0089620 A1* | 3/2015 | Manza | H04L 63/10 |
| | | | 726/8 |
| 2015/0180908 A1 | 6/2015 | Dang et al. | |
| 2016/0323775 A1* | 11/2016 | Luna | H04L 67/2885 |
| 2017/0235966 A1* | 8/2017 | Ray | G06F 21/6218 |
| | | | 713/165 |
| 2018/0032720 A1 | 2/2018 | Milner et al. | |
| 2019/0124042 A1* | 4/2019 | Thomas | H04L 9/3213 |

\* cited by examiner

METHOD AND SYSTEM FOR TRANSMITTING SOFTWARE ARTIFACTS FROM A SOURCE NETWORK TO A TARGET NETWORK

CROSS-REFERENCES TO RELATED APPLICATIONS

This application is the U.S. National Stage of International Application No. PCT/EP2021/059246, filed Apr. 9, 2021, which designated the United States and has been published as International Publication No. WO 2021/209323 A1 and which claims the priority of European Patent Application, Ser. No. 20/170,134.9, filed Apr. 17, 2020, pursuant to 35 U.S.C. 119 (a)-(d).

BACKGROUND OF THE INVENTION

The invention relates to a preferably computer-implemented method for transmitting software artifacts from a source network to a target network, wherein a proxy system with a plug-in is arranged between the target network and the source network, wherein the transmission is monitored on the target network side.

The invention also relates to the aforementioned plug-in.

The invention additionally relates to a system, in particular an IT system, in which the aforementioned plug-in can be employed to implement the aforementioned method.

To make advantages in the field of digitalization accessible, cloud and in particular edge computing builds a bridge between the world of traditional automation and the world of IT data processing thanks to the innovations of digitalization.

Thus faster firmware and software update cycles are being used on the edge, and are bringing the automation of industrial and production plants closer to external networks, e.g. the Internet and in particular cloud platforms located on the Internet, which can make available everything necessary for the digitalization of industrial and production plants.

The established, traditional security strategies are having to contend with this "open" scenario. Particularly in the field of edge computing there is a familiar dilemma: either partitioning off cloud-integrated digitalization or opening up the internal corporate networks, so that the attack vector on the automation thereof increases.

Specifically there is a great need for a solution to the following dilemma: On the one hand it should be possible to ensure that the internal corporate network and the automation are protected against malware and other external attacks and at the same time the internal corporate networks should be opened up for digitalization, in order in particular to share in the benefits of fast update cycles in the case of edge platform firmware, edge applications, any types of configurations and in the case of analytical models.

The object of the invention is therefore to increase the security of an internal network of an industrial plant or production plant that uses resources of a cloud platform.

SUMMARY OF THE INVENTION

This object is inventively achieved by a method cited in the introduction, in that
a target-network-internal information structure is provided, wherein the information structure contains entries, for example contains a plurality of entries, wherein each entry in each case characterizes a software artifact that can be downloaded when authorization is granted by an operator of the target network, wherein the transmission of software artifacts is monitored on the target network side by means of the plug-in, wherein:
the entries are read from the target-network-internal information structure,
requests from the target network relating to the availability of new software artifacts are received on behalf of the source network,
for each request at least one entry that matches the request is searched for In the target-network-internal information structure, and
as a function of whether the at least one matching entry is present in the target-network-internal information structure, either the software artifact characterized in the at least one entry that matches the request is retrieved or the request is blocked.

In one form of embodiment it can be provided that the plug-in reads the entries from the target-network-internal information structure, receives requests from the target network relating to the availability of new software artifacts on behalf of the source network, for each request searches for at least one entry that matches the request in the target-network-internal information structure and, as a function of whether the at least one matching entry is present in the target-network-Internal Information structure, either retrieves the software artifact characterized in the at least one entry that matches the request or blocks the request.

In one form of embodiment the target-network-internal information structure can be embodied in the form of a file.

The aforementioned entries can be contained in a file or in another structure (information structure). They may for example be present as entries in a database system that splits the information internally over a plurality of files (distributed data system), or may be present solely in the main memory.

It can be provided that the provision of the target-network-internal information structure is carried out in full by a computer program that processes corresponding commands. Thus the method can be a computer-implemented method.

In one form of embodiment it may advantageously be provided that a request contains the name of a terminal device (type, model, etc.).

In one form of embodiment it may be expedient in respect of the network resources and the expenditure of time if the plug-in pools the same requests, if for example they originate from the same devices, and when searching uses just one request and only downloads once.

In one form of embodiment it may advantageously be provided that the provision of the target-network-internal information structure comprises substeps, in which
messages about available software artifacts are generated in the source network and are transmitted to an operator of the target network, wherein each message contains data that characterizes at least one available software artifact,
each message is checked by the operator to determine whether it is desired to download the at least one available software artifact from the source network,
If it is desired to download the at least one available software artifact, the data characterizing the at least one available software artifact is saved to the target-network-internal information structure, so that each entry in each case characterizes a software artifact, wherein the target-network-internal information structure can preferably be changed only by the operator of the target network.

In one form of embodiment it may be provided that different messages provide information about different software artifacts.

In addition it may be expedient if the requests are generated in the target network at predeterminable intervals of time and are preferably addressed to the source network or to the proxy system.

The security of the target network can be further increased if in order to retrieve the software artifact a connection is set up in just one direction, namely from the target network to the source network, and is disconnected again following the retrieval.

In this case it may advantageously be provided that the plug-in downloads the software artifact on behalf of the target network. Thus for example a cloud server in the cloud sees the plug-in that acts on behalf of the edge devices in the target network.

In addition it may be advantageous if the plug-in sets up a connection between the target network, e.g. a client (edge device) in the target network, and a server (e.g. a backend) in the source network, so that the software artifact is downloaded directly onto the client.

In addition it may be provided that the plug-in forwards the downloaded software artifact to at least one device registered in the target network, e.g. to an edge device, wherein preferably the software artifact is then installed on the at least one device.

A further security measure may be taken if the software artifact is checked in respect of its integrity by means of the plug-in.

It may be expedient in this case if the integrity check comprises a signature validation of the software artifact.

In this case the signature of the downloaded software artifact files can be checked. If this optional check is not successful, the downloaded artifact can be deleted and an alert can optionally be generated on the customer's side.

It may be expedient if each entry comprises an identification of the software artifact and/or a cryptographic signature of the software artifact, for example a signed hash of the file content of the software artifact, and/or an indication of a point in time at which the software artifact can be downloaded, and/or a textual description, for example a change log.

In one form of embodiment it may advantageously be provided that key pairs are generated from private and public keys, wherein the private keys are provided to the source network and the public keys are provided to the target network, wherein the software artifacts are signed with signatures generated by means of the private keys in the source network (before downloading) and the signatures of the signed software artifacts are validated by means of the corresponding public keys on each device in the target network for which the software artifact is intended.

In this case a private key may in each case be used for example for signing each software artifact.

This can for example enable end-to-end signing of the artifact by the platform provider with generation of an artifact signature by means of a private key of the platform provider prior to downloading the artifact in the cloud (in the source network) and validating the artifact by means of an associated public key in the target network prior to installation on the edge.

It can furthermore be expedient if the software artifact is encrypted prior to downloading and decrypted after downloading.

As a result for example an end-to-end encryption of the software artifact by the platform provider can be enabled on the basis of a public key of the platform provider prior to downloading the artifact in the cloud (in the source network) and decrypting the software artifact by means of an associated private key in the target network, e.g. on an edge device prior to installation on the edge.

In respect of auditing, it may be expedient if all the steps of the method are logged, wherein each step is preferably provided with a time stamp, wherein a log created thereby is preferably saved in a database, wherein the database is contained in the target network.

It may also advantageously be provided that the plug-in at least partially records details relating to the requests and the download in a log data structure.

The log data structure can for example be defined in the form of a log file and preferably recorded in a persistent or volatile database or in an archive system.

Furthermore, the object is inventively achieved with a plug-in of the aforementioned type, in that the plug-in is configured:
- to read entries from a target-network-internal information structure, wherein each entry in each case characterizes a software artifact that can be downloaded when authorization is granted by an operator of the target network,
- to receive requests from the target network to the source network relating to the availability of new software artifacts on behalf of the source network,
- for each request to search for at least one entry that matches the request in the target-network-Internal information structure, and
- as a function of whether the at least one matching entry is present in the target-network-internal information structure, either to retrieve the software artifact characterized in the at least one entry that matches the request or to block the request.

In this case the plug-in can have a corresponding code and the target-network-internal information structure can have a structure that matches the code of the plug-in, so that the plug-in and the target-network-internal information structure match one another and reading the entries from the target-network-Internal information structure is facilitated.

In one form of embodiment it may be provided that the plug-in is embodied as a firewall, e.g. a proxy firewall—in other words has all the functionalities of a firewall—or at least comprises part of a set of firewall rules.

The object of the invention is also inventively achieved with a system of the aforementioned type, in that the system comprises a source network, a target network, a proxy system interposed between the target and the source network and a target-network-internal information structure, wherein the proxy system comprises the aforementioned plug-in, the information structure contains entries, wherein each entry in each case characterizes a software artifact that can be downloaded when authorization is granted by an operator of the target network, and the system preferably comprises additional means, e.g. software and hardware components for executing the steps of the aforementioned method.

BRIEF DESCRIPTION OF THE DRAWING

The invention is described and explained in greater detail below on the basis of the exemplary embodiments shown in the figures, in which.

DETAILED DESCRIPTION OF PREFERRED EMBODIMENTS

Figure 1:
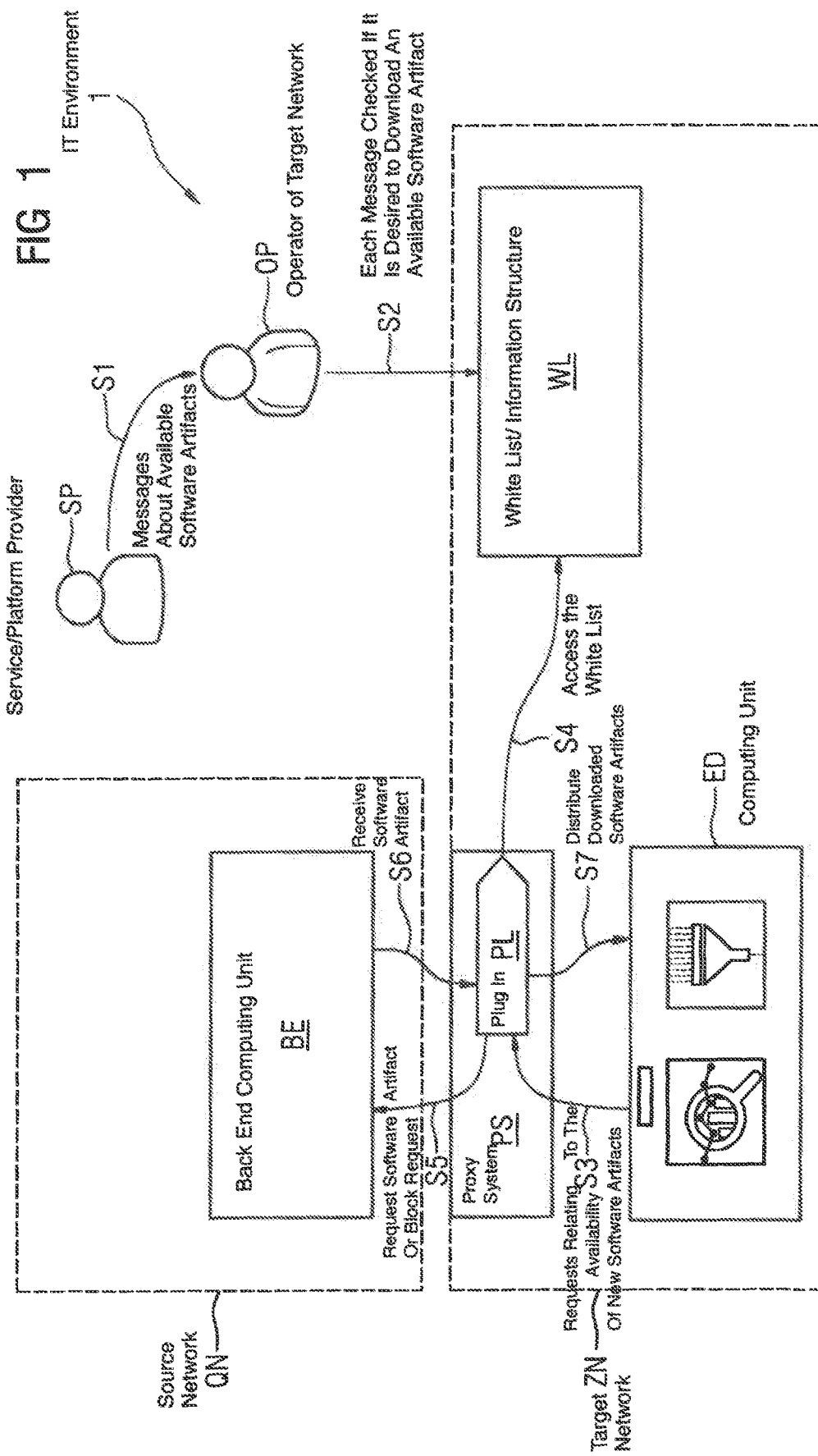
FIG. 1 shows a first IT environment.

In the exemplary embodiments and figures elements that are identical or that have an identical effect are in each case provided with the same reference characters.

FIG. 1 shows a greatly simplified information technology environment (IT environment or an IT ecosystem), in which an example of the inventive method can be implemented.

The IT system 1 shown can comprise a source network QN, a target network ZN and a proxy system PS interposed between the target and the source network.

For example, it can be provided that the devices registered in the target network ZN can only be accessed by the proxy system PS from the source network QN.

The source network QN can comprise a cloud computing platform or an edge management platform that is assigned to the target network ZN and for example manages a set of edge devices.

The target network ZN can for example be embodied as a local network of a, for example, automated industrial plant, in particular a production plant, and one or more computing units, e.g. IoT devices, in particular edge devices ED, that are registered in the target network. The computing units can for example be configured to process data about the operation, e.g. the production of the plant, or collect it, store it, send it to the source network, etc. This may for example be process data. The list of tasks that can be executed by the computing units is not exhaustive.

In addition the target network can comprise one or more subnetworks (not shown here). One example of such a subnetwork can be a machine network of a machine, e.g. a machine tool or a robot. The machine can be fitted with a smart camera, wherein Image-processing software can be installed on the camera.

One or more such machines can in each case be assigned to one of the aforementioned computing units, e.g. an edge device, in order to receive data from the one or more machines.

Each computing unit ED can be connected to the proxy system PS by means of one or more data transmission channels.

For example, the target network can be embodied such that the computing units ED do not communicate with one another, but solely with the assigned machine(s) and the proxy system PS.

The proxy system PS can comprise one or more proxy components, wherein each component can be embodied as a software and/or hardware component. A proxy component can be embodied e.g. as a proxy server (dedicated proxy) or as a generic proxy. Furthermore, a proxy component can be embodied as a proxy firewall.

The hardware components can be embodied as structurally separate.

For example, the proxy system PS can comprise a single proxy component, to which all the aforementioned computing units ED are assigned. In this case this proxy component can be provided by the manufacturer of the computing units ED. In one form of embodiment the manufacturer of the computing units ED can also act as a service/platform provider SP, which offers its services/platform via the source network QN.

For example, a proxy component such as this can in the simplest case be responsible for communication between the computing units and the source network QN, i.e. forwarding data (without filtering it) from computing units to the source network QN and from the source network QN to the corresponding computing units.

To filter and monitor general traffic the proxy system PS can also for example comprise a proxy firewall.

The source network can for example be embodied as the Internet or as a cloud. For example, a backend computing unit BE can be located in the cloud, which—viewed from the perspective of communications technology—is arranged close to the target network ZN. The backend computing unit BE can for example be embodied as a backend server that is assigned to the target network and for example receives, processes and manages requests from the target network on behalf of the source network. The backend server can also be available to the target network ZN as a computing resource in the cloud. It is entirely conceivable for all communication between the source network QN and the target network ZN to run on the source network side via a backend server BE such as this. Furthermore, the backend computing unit BE can make the necessary software artifacts available for the computing units in the target network ZN.

The backend computing unit BE can for example be part of the aforementioned edge computing platform, which is managed by the source network.

The target network ZN comprises a target-network-internal information structure WL that contains entries, for example a plurality of entries, wherein each entry in each case characterizes a software artifact that can be downloaded when authorization is granted by an operator OP of the target network ZN. An information structure such as this can be called a "download whitelist" or simply a "whitelist".

Different entries preferably characterize different software artifacts.

Each entry can comprise an identification of the software artifact and/or a cryptographic signature of the software artifact, for example a signed hash of the file content of the software artifact, and/or an indication of a point in time at which the software artifact can be downloaded, and/or a textual description, for example a change log.

Software artifacts can for example be embodied as software packages. Each software package may take various forms, e.g. as a firmware installation file (binary file), an edge app installation file (binary file), a configuration file (JSON text file), an analytical model (PMML/plain XML/JSON file/a file archive that contains what is known as a SavedModel from TensorFlow/a serialized rule base/a description logic definition for logic-based models, etc.), what is known as an onboarding file, which contains information in order to train an edge device ED for communication with the cloud or with a specific cloud platform, etc.

In addition each software package can be embodied as pure content without the shell of a file. The content can be present and be transmitted in various formats (e.g. XML, JSON, plain text, binary encoding). Content such as this can for example be: part of a configuration for edge device ED firmware or for an edge app, e.g. what is known as a JSON snippet, which contains changes to local edge user management and role management, or can define the maximum amount of working memory an edge app may use; a list of work instructions (known as job information) which the corresponding edge device ED should process, e.g. instructions for downloading further information from the cloud, instructions for rebooting the edge device ED or an application for executing an action on a connected device (stopping a machine/configuring a smart sensor system/actuating an actuating element component); instructions for the execution of data processing operations and/or for a data request to/from a data stream on the edge device ED and/or to/from data that is already stored on the edge device, etc.

In addition, it is possible to specify in each entry the point in time at which the corresponding software artifact is available.

To monitor downloading of the software artifacts from the source network QN to the target network ZN, the proxy system PS, e.g. the proxy component assigned to the computing units ED, comprises a plug-in PL or a software upgrade or a (software) add-on module.

The plug-in is configured to read the entries from the whitelist WL; to receive requests from the target network ZN to the source network ON relating to the availability of new software artifacts on behalf of the source network QN; for each request to search for at least one entry in the whitelist that matches the request, and, as a function of whether the at least one matching entry is present in the whitelist, either to retrieve the software artifact characterized in the at least one entry that matches the request or to block the request.

In one form of embodiment the assets or the edge devices ED can interrogate the proxy system PS including the plug-in PL for retrieval of the software artifact in the target network instead of the server in the source network ON. In this case it can be provided that each asset, e.g. edge device, sends the requests either to the proxy system PS, which forwards them to the plug-in PL, or direct to the plug-in PL. For communication between the proxy system PS (including the plug-In PL) and the source network ON (the cloud) there is only ever one option: the plug-in PL (and not the proxy system PS) must compulsorily monitor the connection to the source network ON or to the cloud.

The proxy system PS can in this case be transparent or non-transparent for the computing units ED.

In one form of embodiment the proxy system PS can use an interface of the plug-in PL to manage the life cycle thereof, for example to start and stop preferably whenever the proxy system PS (or the proxy component PK) is itself started and stopped.

In one form of embodiment the proxy system PS can be configured such that it need not be involved at all in the actual communication between the target network ZN (assets or edge devices ED) and the source network ON (cloud), but can manage just the plug-in PL.

In one form of embodiment the proxy system PS can be configured such that it can accept the requests from the target network ZN (e.g. from the assets or edge devices ED) and forward them to the plug-in PL, wherein the plug-in PL only then becomes directly responsible for communication with the source network ON (the cloud) and returns the downloaded artifacts first to the proxy system PS which transmits them to the retrieving assets or edge devices ED. For this it may be expedient if in the case of the plug-in PL an additional interface is implemented, via which the proxy system PS can transmit to the plug-in PL all the relevant information for communication with the source network ON, such as e.g. address in the source network ON from where the artifact can be obtained (e.g. IP and port), syntax and semantics of the retrieval in the source network ON (e.g. an HTTPS request with information on the artifact identification), security features (e.g. what is known as a security token for authentication and authorization in the source network QN).

The requests relating to the availability of new software artifacts can for example be generated by means of the computing units ED. These requests can for example be addressed directly to the proxy system PS, in particular to any proxy component that is assigned to the corresponding computing unit ED.

The requests can be generated at predeterminable, preferably regular intervals of time. For example, each edge device ED can address a request for new software artifacts to the proxy system PS every hour or every day.

For the retrieval of the software artifact or software artifacts a connection can be set up from the target network ZN to the source network ON and can be disconnected again after the retrieval. The set-up and/or disconnection of the connection can take place simply using the plug-in PL, which can start a corresponding request as a request to download a software artifact/multiple software artifacts to a server in QN, wherein the requested software artifact(s) can be returned in the form of a response in answer to the request, providing the requested software artifact(s) is/are present in the source network QN and the plug-in PL and/or the requesting edge device(s) is/are authenticated correctly by the requested server in ON and is/are entitled to request software artifact(s) in ON.

In one form of embodiment the request can be configured as a request by the plug-in PL to a server in the source network ON and for example can follow what is known as a "request-response" pattern.

In this case the plug-in PL can first set up a request structure (e.g. an HTTPS request), in which all the information is contained that can help a server in the source network ON to decide which software artifact has been requested—the ArtifactID or a sufficiently precise description of the artifact can essentially suffice for this. In addition, security features (e.g. a JSON web token) can be assigned to the request. With the help of the security features the server in the source network ON to which the request is being made can authenticate and/or authorize the plug-In PL and preferably also the assets or edge devices ED originally making the request. The server in the source network ON can for example in this way ensure that the identity predefined by the plug-in PL (and optionally that of the one or more edge devices ED) is correct, and that the plug-in PL (and optionally the one or more edge devices) are entitled to obtain the software artifact.

The request can finally be sent to the server to the source network QN. This can process the request, e.g. after successfully checking the security features (e.g. seeking out or generating the requested software artifact in ON) and reply to the request by means of a response (e.g. HTTPS response).

The response from the server in the source network ON can then be transmitted to the plug-in PL and from there distributed over the one or more assets or edge devices in accordance with their original request, whereupon the aforementioned request/response log can be concluded. Distribution over multiple assets e.g. edge devices, is for example possible in the context of artifact caching.

The plug-in PL thus also has, besides the identification information (e.g. ID/IDs or URL/URLs) of the software artifact(s) requested by the edge device(s) ED, all the information for the performance of the actual retrieval of the software artifact(s) for download from the cloud. The plug-in can for example contain this information by means of a "command" design pattern known from the prior art, see e.g. part of what are known as the "gang-of-four" software architecture patterns.

The plug-in PL can for example download the software artifacts to the plug-In or the proxy system PS or directly to the corresponding computing unit(s).

When downloading to the plug-In or to the proxy system PS the plug-in PL downloads the software artifacts on behalf of the corresponding computing unit(s) firstly to the plug-in or the proxy and from there, regardless of a connection to QN, distributes the downloaded software artifacts further over the corresponding computing unit(s).

For direct downloading of the software artifacts to the edge devices ED the plug-in can set up a connection between the client (edge device ED) in the target network ZN, and the server (e.g. the backend BE) In the source network QN.

As soon as the software artifact(s) has/have arrived at the corresponding computing unit ED, it/they can be installed thereon.

FIG. 1 additionally shows an exemplary embodiment of an inventive method. The method steps are characterized with arrows.

In a first step S1 messages about available software artifacts are generated in the source network ON and are transmitted to the operator OP of the target network ZN.

The messages can for example be transmitted by the service/platform provider SP. In this case all possible ways are conceivable. For example, the service provider SP can send the operator OP letters, email notifications, push messages, messages as per SMS or similar. The messages can additionally be transmitted automatically (e.g. link to an asset management system of the operator OP such as SAP for example).

Each message contains data that characterizes at least one available software artifact. It is also conceivable for the operator OP to be notified about multiple available software artifacts in one message.

In a second step S2 each message is checked by the operator OP to determine whether it is desired to download the at least one available software artifact from the source network ON, and if it is desired to download the at least one available software artifact, the data characterizing the at least one available software artifact is saved in the whitelist, so that each entry in each case characterizes a software artifact. The characterizing data can for example contain, among other things, an identification, a cryptographic signature and a description of the software artifact. The aforementioned check on the messages and the entries in the whitelist WL can likewise take place automatically, so that the provision of the whitelist can take place automatically, e.g. with the help of a software program.

To increase the security of the target network ZN, it is possible for just the operator OP and preferably persons or software programs of the target network ZN determined by the operator to be authorized to change the whitelist WL.

Steps S1 and S2 can form substeps of the provision of the whitelist.

In a third step S3 the plug-in PL receives on behalf of the source network QN the requests from the computing units ED from the target network ZN relating to the availability of new software artifacts, which preferably can be installed on corresponding computing units ED.

In a fourth step S4 the plug-in PL accesses the whitelist WL—preferably without changing the whitelist—and compares each request with the entries in the whitelist WL, in order to find at least one, preferably all entries in the whitelist that match the request.

In a fifth step S5 the plug-in PL requests—in the event of a match—the software artifact(s) that is/are characterized in the entry/entries that match the request, or, if no match could be found, blocks the request.

In one form of embodiment the plug-in PL can only trigger/initiate or permit the download of the software artifacts, wherein the download itself can be performed by means of the proxy system PS or a corresponding proxy component.

Furthermore, the plug-in can temporarily collect and store the requests in a request structure, e.g. In a request file or a request database on the proxy system PS or for example in a volatile buffer store and not compare the request structure with the whitelist WL until after a predefined time (cache timeout) or not until after the request structure has reached a predefined size.

In a sixth step S6 the plug-in can receive the software artifact(s) on behalf of the edge devices ED and store them on the proxy system PS, for example in a persistent memory or in a volatile memory.

The stored software artifacts can distribute the plug-in PL over the computing units ED in a further step S7. This can take place in an optimized manner, e.g. at a predefined point in time, at which the machines that are assigned to the computing units are not in operation or when there is little load on the target network ZN, or at a specific point in time that is scheduled by the operator OP.

The IT system 1 can also have additional means for the automated execution of all the cited steps S1 to S8 (not shown). In particular, the IT system can comprise software with a list of commands, wherein if these commands are processed by one or more processors in the IT system, the IT system 1 executes the steps S1 to S8.

Figure 2:
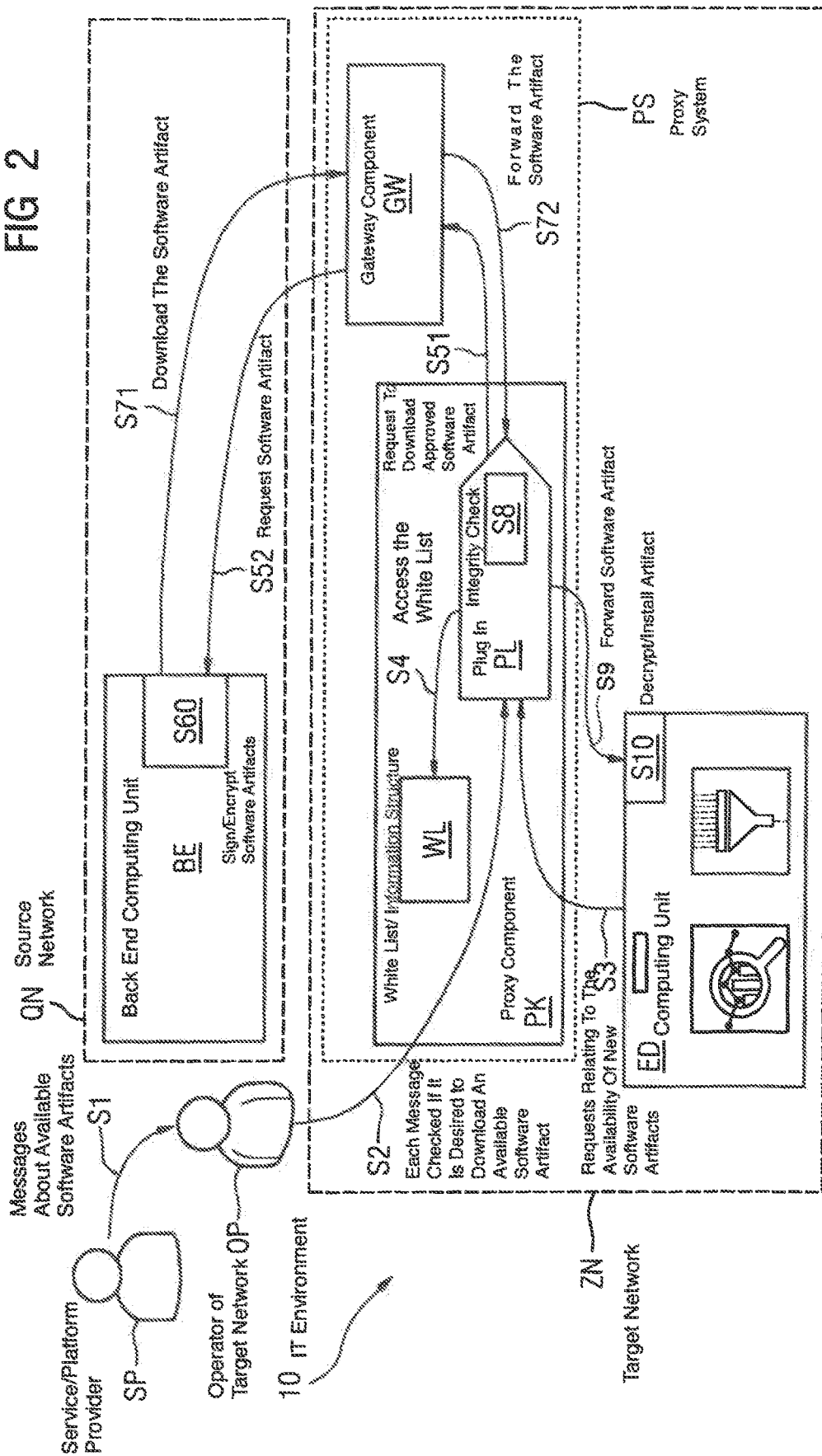
FIG. 2 shows a second IT environment.

FIG. 2 shows a further form of embodiment of the invention. The following description is essentially limited to the differences from the form of embodiment in FIG. 1, wherein reference is made to the description of the exemplary embodiment in FIG. 1 in respect of unvarying elements, features, method steps and functions.

The IT environment 10 shown schematically in FIG. 2 likewise comprises the plug-in PL and the whitelist WL. The proxy system PS in this case comprises a proxy component PK, that can communicate directly—i.e. without further intermediate components—with the computing units ED, and a gateway component GW, which is upstream of the proxy component PK, in order to route and monitor the traffic between the proxy component PK and the source network QN. The proxy component PK can for example be provided by the service provider or platform provider SP and/or by the manufacturer of the computing units ED. The gateway component GW can for example be provided by the operator OP of the target network ZN.

The gateway component GW can be embodied as an API gateway.

The proxy component PK comprises both the plug-in PL and the whitelist WL. In another form of embodiment the whitelist WL can, as shown in FIG. 1, represent a standalone independent component preferably monitored by the operator OP.

To download the approved software artifacts the plug-in PL forwards the corresponding request to the gateway component GW—step 51, wherein this acts on behalf of the target network ZN and in the case of the backend computing unit BE requests the software artifact—step 52.

Prior to release to the gateway component GW the backend computing unit BE can sign and/or encrypt the software artifacts—step S60.

To this end key pairs can be generated from private and public keys, wherein the private keys are provided to the source network ON, e.g. the backend computing unit BE, and the public keys are provided to the target network ZN, e.g. the proxy component PK, the plug-in PL or the computing units ED. The software artifacts can be signed with signatures generated by means of the private keys in the source network ON, e.g. by means of the backend computing unit BE.

It is also conceivable for the signatures of the signed software artifacts to be validated by means of the corresponding public keys on the edge device ED in the target network ZN, to which the software artifact is forwarded by the plug-in PL.

The aforementioned distribution of the keys describes the requirements for signing the software artifacts in the source network ON and integrity checking of the signed software artifacts in the target network ZN. For an encryption of the software artifacts the distribution of the keys for an asymmetrical encryption is reversed. In a further form of embodiment an encrypted transmission via symmetrical encryption is possible.

Once the software artifact(s) has/have been downloaded—step 71—and have been forwarded to the proxy component PK by means of the gateway component GW—step 72, the plug-in PL can check the software artifact in respect of its integrity—step S8. The integrity check can for example comprise a signature validation of the software artifacts. This integrity check can in a further form of embodiment alternatively or additionally take place on the edge device(s) ED.

Independently of the integrity check the proxy component PK can cache the downloaded software artifacts locally, so that they can be delivered (optimized as regards Internet communication) to multiple edge devices ED.

If this optional check is not successful, the downloaded software artifact, the signature of which could not be validated, can be deleted and optionally an alarm, e.g. addressed to the operator OP, can be generated in the target network ZN.

If the integrity check is successful, the software artifact can be forwarded to the corresponding edge device ED—step S9.

Following the receipt of the software artifact, the computing unit ED can decrypt it—if it was transmitted encrypted—step 10—and then install it.

In addition, all the steps of the method can be logged, wherein each step is preferably provided with a time stamp, wherein a log created in this way is preferably saved in a database, wherein the database is contained in the target network ZN.

Furthermore, the plug-in can record at least in part details relating to the requests and the download in a log file.

This way of auditing all details in a database can be useful for the traceability and non-disputability of the individual steps of the method.

The form of embodiment described in connection with FIG. 2 for example enables end-to-end encryption of the software artifact by the platform provider SP on the basis of a public key of the platform provider prior to downloading the artifact in the cloud and decryption of the artifact by means of an associated private key in the target network ZN, e.g. prior to installation on the computing unit ED.

The form of embodiment described in FIG. 2 also for example permits end-to-end integrity security of the software artifact from the perspective of the platform provider SP and/or of the operator OP, in that the artifacts are cryptographically signed prior to being downloaded from the cloud and are checked for integrity prior to being installed on the edge devices ED on the basis of their signature (e.g. a hash calculation via an artifact file).

The plug-in can be embodied as a firewall, e.g. a proxy firewall, in other words it can have all the functionalities of a firewall.

Although the invention has been illustrated and described in greater detail using exemplary embodiments, the invention is not restricted by the disclosed examples. Variations herefrom can be derived by the person skilled in the art, without departing from the scope of protection of the invention, as is defined by the following claims. In particular, described systems and plug-ins can be improved by features that have been described or claimed in respect of the methods and vice versa.

What is claimed is:

1. A method for transmitting software artifacts from a source network to a target network in an industrial plant, the method comprising:
    arranging a proxy system, the proxy system comprising a plug-in, between the target network and the source network of the industrial plant,
    monitoring the transmitting of the software artifacts on a target network side of the industrial plant by the plug-in,
    providing a target-network-internal information structure, the information structure containing entries, each entry in each case characterizing a software artifact that can be downloaded when authorization is granted by an operator of the target network of the industrial plant,
    reading the entries from the target-network-internal information structure by the plug-in,
    receiving requests from the target network of the industrial plant relating to the availability of new software artifacts on behalf of the source network by the plug-in,
    searching, for each request, for at least one entry that matches the request in the target-network-internal information structure by the plug-in, and
    when the at least one matching entry is present in the target-network-internal information structure, retrieving by the plug-in the software artifact characterized in the at least one entry that matches the request by setting up a connection in just one direction, namely from the target network of the industrial plant to the source network, and disconnecting the connection after the software artifact is retrieved, and
    when the at least one matching entry is not present in the target-network-internal information structure, the request is blocked by the plug-in.

2. The method of claim 1, wherein the providing of the target-network-internal information structure further comprises:
    generating and transmitting, to an operator of the target network, messages about available software artifacts in the source network, each message containing data that characterizes at least one available software artifact,
    checking each message by the operator of the target network in order to determine whether it is desired to download the at least one available software artifact from the source network, and
    when it is desired to download the at least one available software artifact, the data characterizing the at least one available software artifact is saved to the target-network-internal Information structure, so that each entry in each case characterizes a software artifact, wherein the target-network-internal information structure can preferably be changed only by the operator of the target network.

3. The method of claim 2, further comprising downloading by the plug-in the software artifact on behalf of the target network.

4. The method of claim 3, further comprising setting up by the plug-in a connection between the target network and a server in the source network, in order to download the software artifact.

5. The method of claim 4, further comprising setting up by the plug-in a connection between at least one device registered in the target network and the server in the source network, in order to download the software artifact.

6. The method of claim 3, further comprising forwarding by the plug-in the downloaded software artifact to at least one device registered in the target network, wherein the software artifact is preferably then installed on the at least one device.

7. The method of claim 3, further comprising:
encrypting the software artifact prior to being downloaded, and
decrypting the software artifact after being downloaded.

8. The method as claimed in one of claim 3, further comprising recording by the plug-in at least in part details relating to the requests and the download in a log data structure.

9. The method of claim 8, further comprising defining the log data structure as a log file.

10. The method of claim 8, further comprising recording the log data structure in a persistent or volatile database or in an archive system.

11. The method of 1, further comprising generating the requests in the target network at predeterminable intervals of time and preferably addressing the requests to the source network or to the proxy system.

12. The method of claim 1, further comprising checking the software artifact in respect of its integrity by the plug-in.

13. The method of claim 12, the checking further comprising validating a signature of the software artifact.

14. The method of claim 1, wherein each entry in the target-network-internal information structure comprises an identification of the software artifact and/or a cryptographic signature of the software artifact, and/or an indication of a point in time at which the software artifact can be downloaded, and/or a textual description.

15. The method of claim 14, wherein the cryptographic signature of the software artifact is a signed hash of the file content of the software artifact, and/or the textual description is a change log.

16. The method of claim 1, further comprising:
providing private keys to the source network,
providing public keys to the target network,
generating key pairs from the private keys and the public keys,
signing the software artifacts in the source network with signatures generated by the private keys, and
validating the signatures of the signed software artifacts by the corresponding public keys on each device in the target network for which the software artifact is intended.

17. The method of claim 1, further comprising:
logging all the steps of the method,
creating a log, and
saving the log in a database.

18. The method of claim 17, further comprising providing each step of the method with a time stamp, and wherein the database is contained in the target network.

19. The method of claim 1, wherein the target-network-Internal information structure is embodied in a form of a file.

20. The method of claim 1, further comprising forming the entries as entries in a database system.

21. The method of claim 20, wherein the database system is designed to split the entries over a plurality of the target-network-internal information structures.

22. The method of claim 20, wherein the database system is a distributed database system.

23. The method of claim 1, further comprising performing the providing of the target-network-internal information structure in full by a computer program that processes corresponding commands.

24. The method of claim 1, wherein requests contain a name of a terminal device.

25. The method of claim 24, wherein the name of the terminal device is a type or a model of the terminal device.

26. The method of claim 1, further comprising when the requests are the same, pooling by the plug-in requests that are the same, searching using just one request and only downloading once.

27. A proxy system arranged between a target network of an industrial plant and a source network, the proxy system comprising:
a gateway component operatively connected to the source network; and
a proxy component operatively connected to at least one computing unit of the target network of the industrial plant, the proxy component comprising a plug-in configured to:
read entries from a target-network-internal information structure, wherein each entry in each case characterizes a software artifact that can be downloaded when authorization is granted by an operator of the target network of the industrial plant,
receive requests from the target network of the industrial plant to the source network relating to the availability of new software artifacts on behalf of the source network,
search, for each request, for at least one entry that matches the request in the target-network-internal information structure, and
when the at least one matching entry is present in the target-network-internal information, retrieve the software artifact characterized in the at least one entry that matches the request and set up a connection in just one direction, namely from the target network of the industrial plant to the source network, and to disconnect the connection after the software artifact is retrieved, and
when the at least one matching entry is not present in the target-network-internal information structure, block the request.

28. An industrial plant, comprising:
a source network,
a target network comprising at one least computing unit and at least one machine assigned to the at least one computing unit,
a proxy system interposed between the target network of the industrial plant and the source network and a target-network-internal information structure, wherein the proxy system comprises a plug-in configured to:
read entries from the target-network-internal information structure, wherein each entry in each case characterizes a software artifact that can be downloaded when authorization is granted by an operator of the target network of the industrial plant, receive requests from the target network of the industrial plant to the source network relating to the availability of new software artifacts on behalf of the source network, search, for each request, for at least one entry that matches the request in the target-network-internal Information structure, and when the at least one matching entry is present in the target-network-internal information, retrieve the software artifact characterized in the at least one entry that matches the request and set up a connection in just one direction, namely from the target network of the industrial plant to the source network, and to disconnect the connection after the software artifact is retrieved, and when the at least one matching entry is not present in the target-network-Internal information structure, block the request;

and the information structure contains entries, wherein each entry in each case characterizes a software artifact that can be downloaded when authorization is granted by an operator of the target network of the industrial plant, wherein the system preferably comprises additional means for executing the steps of a method as claimed in claim 1.

* * * * *